United States Patent [19]

Kaiser et al.

[11] Patent Number: 5,491,016
[45] Date of Patent: Feb. 13, 1996

[54] BULKABLE POROUS NONWOVEN FABRIC

[75] Inventors: H. Paul Kaiser, Tuckerton; Ellen Mosley, Ventnor; Samuel C. Baer, Woodbury; Kenneth Bononcini, Newfield, all of N.J.

[73] Assignee: FiberTech Group, Inc., Landisville, N.J.

[21] Appl. No.: 213,609

[22] Filed: Mar. 15, 1994

[51] Int. Cl.⁶ ............................................ B32B 27/14
[52] U.S. Cl. .......................... 428/198; 428/114; 428/296; 428/913; 156/85; 156/290; 156/308.4
[58] Field of Search ...................... 428/103, 286, 428/288, 114, 198, 296, 913; 156/85, 290, 308.4

[56] References Cited

U.S. PATENT DOCUMENTS

| | | | |
|---|---|---|---|
| 3,917,448 | 11/1975 | Wood | 8/125 |
| 4,018,862 | 4/1977 | Saito | 264/137 |
| 5,143,779 | 9/1992 | Newkirk et al. | 428/218 |
| 5,198,057 | 3/1993 | Newkirk et al. | 156/83 |

*Primary Examiner*—Christopher W. Raimund
*Attorney, Agent, or Firm*—Juettner Pyle Lloyd & Piontek

[57] ABSTRACT

A heat shrinkable nonwoven fabric includes outer layers of thermoplastic staple fibers and an inner layer containing heat shrinkable fibers the layers are point bonded together at spaced locations without causing shrinkage of the heat shrinkable fibers. The web may then be uniformly heated in a relaxed state to cause a substantial increase in bulk.

11 Claims, No Drawings

BULKABLE POROUS NONWOVEN FABRIC

BACKGROUND OF THE INVENTION

This invention relates to nonwoven fabrics which may be produced in compact or low bulk roll form and later bulked by the end user by application of heat.

Nonwovens are widely used in disposable garments such as diapers or others sanitary goods having a liquid absorbing element. Such items necessarily include a top or cover sheet which resides between the skin surface and the inner absorbent layer or layers. The function of the cover sheet is to provide an outwardly facing surface having maximum softness. Also, this sheet must be porous and have maximum bulk or thickness per unit weight to permit rapid draining away of liquids from the body into the liquid absorbing core and providing a liquid insulating effect and dry feel.

In order to increase the bulk or thickness of nonwoven fabrics, it is known to include quantities of heat shrinkable fibers, such as bicomponent fibers, which shrink, curl or otherwise contract when heated to a certain temperature. Many varieties, such as sheath/core and side-by-side bicomponent types, as well as single component types, are well known. In some cases, the bicomponent fibers are pre-crimped to achieve bulk, and a component of the fiber is melted to attain bonding. In other cases, the bicomponent fiber is heat activated with other fibers to increase bulk.

EP 181300 describes a method in which low shrinkage fibers are uniformly blended with high shrinkage fibers and formed into a fabric. The fabric is then heated at spaced locations to cause bulking of the fabric in a pattern. To achieve the desired bulk, 60–75% of the fibers are of the bicomponent type.

British patent 1334735 discloses the concept of securing a plurality of heat shrinkable threads by an adhesive to a fabric, and subsequently heating the composite.

Most so-called high luft cover fabrics are bulked during the process of manufacture. As a practical matter, these bulked fabrics must be wound into rolls, slit into narrow widths, and shipped to a converter for conversion into the component for a sanitary article. If the web is initially formed in a bulked state, this unnecessarily increases transportation costs, as well as handling costs, since the amount of material available on one roll is limited, necessitating frequent roll changes by the manufacturer and the converter.

In view of the above, a recent important goal in this field of nonwovens is to provide a fabric which can be manufactured and shipped with the minimal thickness and then later be bulked on line by the converter, preferably by heating or some other expedient means.

One proposed solution to this objective is to subject the bulked web, as produced, to compression or tension prior to final winding on rolls prior to shipment. This requires that the web must have capability of being restored to at least a portion of its original bulk.

An example of compression technique is described in U.S. Pat. No. 4,601,937 wherein the web is heated and compacted in a fashion such that it can be rebulked by steaming. U.S. Pat. No. 5,143,779 discloses a fabric which is produced in an initial lofty state and subjected to compression or tension while winding onto a roll. The fabric is later subjected to heat to rebulk the fabric. Both of these described processes apparently rely on the memory of fibers in its original bulked form, and this may vary over time and handling conditions.

SUMMARY OF THE INVENTION

An object of the present invention is to provide a nonwoven composite fabric, which, as originally produced, has minimal bulk, and which can be stored and shipped in compact form and later heat bulked in a convenient, reliable and efficient fashion.

The nonwoven fabric of the present invention comprises a sandwich web construction having two outer layers of thermoplastic staple fibers and an inner layer comprising heat shrinkable bicomponent fibers. The bicomponent fibers are activated at a temperature below the heat softening temperature of the staple fibers. The bicomponent fibers comprise less than 25% of the basis weight of the web.

The fiber layers are formed into a fabric by point bonding using calender rolls under heat and pressure to provide a pattern of point bond sites across the web. The bicomponent fibers, requiring heat along their lengths to be activated, are not activated by this procedure and are not shrunk by the point bonding process. The fibers of the layers are preferably carded or oriented substantially in the machine direction of the web, and the web has high tensile strength in the machine direction.

The compact web is not bulked at this stage but is wound onto rolls for shipment to a conversion facility. As needed, the web is unwound and uniformly heated in a relaxed state to a temperature sufficient to cause maximum activation of the bicomponent fibers in the inner layer and maximum bulking of the fabric. In the preferred embodiment, bulking occurs substantially only in the machine direction to preserve a desired constant width of the material.

The bulkable fabric of the present invention is particularly suitable for use as an interface between a skin surface and a liquid absorbing media, such as in a diaper, sanitary napkin and similar articles. The bulk per unit of basis weight is very high and is substantially higher than that available from prior art processes.

DESCRIPTION OF THE PREFERRED EMBODIMENTS

The heat bulkable fabric of the present invention is made as a flat web of material comprising nonwoven thermoplastic staple fibers. The fibers are preferably composed of a polyolefin and are most preferably composed of polypropylene, although other fibers such as polyester and rayon and mixtures may be employed. For typical applications such as diaper top sheets or coverstock, the denier of the fibers will be in the order of about 1.8 to about 6.

The staple fibers which make up the fabric are preferably crimped and carded by a plurality of sequential conventional cards onto a moving conveyor. Preferably, the process utilizes at least three cards to provide three superimposed layers of fibers, with cards depositing the fibers on the conveyor in substantially the machine direction. The composite web is then passed through the nip of a pair of heated calender rolls under heat and compression in a known fashion. One of the rolls is smooth and the other is engraved to provide point thermal bonding of the fibers through the web. The point bonding results in a stable fabric without activation of the heat shrinkable fibers.

The outer fiber layers of the web preferably consist only of staple fibers, such as polypropylene fibers, which do not undergo any appreciable heat shrink during subsequent processing. The inner fiber layer preferably comprises a mixture of staple fibers and bicomponent fibers which shrink or coil upon application of heat at a particular temperature range.

The preferred heat shrinkable fiber is either a two component side-by-side or sheath/core, such a polyethylene-polyethylene copolymer, which are available from commercial sources. By incorporating the bicomponent fiber in the central fiber layer, it has been found that bulking performance can be enhanced without use of high amounts of the more expensive bicomponent fibers. The amount of bicomponent fibers disposed in the central layer is less than 25 percent of the basis weight of the entire web and is most preferably in the order of from about 5 to about 15 percent without sacrifice to maximum bulking characteristics.

Other than staple fibers and heat shrinkable bicomponent fibers, the central layer may include other types of fibers, such as bicomponent fibers which do not shrink but provide additional point bonds during the heating and bulking operation and improve tensile strength.

The point bonding of the fiber layers into a fabric does not cause any appreciable shrinkable of the bicomponent fibers in the central layer, because the fibers are insulated by the outer layers, and the momentary heat and pressure conditions at the calender do not cause the length of the bicomponent fibers to shrink. These fibers, along with the staple fibers are bonded between spaced bond sites through the web.

An important aspect of this invention is that the temperature at which the bicomponent fiber shrinks is less than the softening temperature of the staple fibers, and preferably less than 5° to 10° C. or greater. This allows the fabric to be subsequently bulked without any thermal effect on or softening of the staple fibers, which would cause the outer layers to become harsh.

Another important aspect of the present invention is the pattern of point bonding of the fabric. The pattern should extend across the web in a cross machine direction or at an acute angle thereto, such as in a zig-zag or chevron pattern. This results in point bonding of fibers relative to the machine direction, with maximum bulking or decrease in length in the machine direction and little or no decrease in width in the cross machine direction. This is important because many converters require a fixed and stable dimension in the cross machine direction.

Contrary to prior art practices, the fabric as initially formed is not in a bulked condition and may be slit and wound onto compact high density rolls for storage and subsequent transportation to a converter. This results in substantial savings in handling, storage and transportation costs. The fabric is intentionally designed to be bulked by suitable heat treatment on a heater installed on the processing line of a converter or subsequent processor.

In order to bulk the fabric, it is heated in a relaxed state to a temperature sufficient to cause maximum shrinkage of the bicomponent fibers without having any significant thermal effect on the staple fibers. This is preferably accomplished by a heating process in which the thermal gradient between the outer surfaces of the web and the inner portion is minimized. For example, a stream of hot air may be passed through the web, or the web may be gradually heated on rollers. Other acceptable methods include radiant heating under conditions which prevent excessive heating of the outer layers.

It has been found that by selectively placing and point bonding the heat shrinkable fibers in a central region of the fabric, maximum bulk and minimum density are obtained during the heat bulking step. The basis weight of the fabric for use as coverstock in an unbulked condition is in the order of 15 to 40 gsm, and the basis weight after bulking is from 20 to 50 gsm. After bulking, it has been found that an increase in thickness of up to 400 percent is attainable.

Also, for coverstock applications, it is possible to design the fabric so that one outer surface has maximum softness, for contact with the skin, the other outer surface has greater porosity and channeling to allow more rapid draining away of liquids toward an absorbent diaper core. As an example, the soft outer layer may comprise relatively small denier (1.0 to 3.0) fibers, and the other outer layer may comprise coarser fibers.

The following is a more specific example of the product and process described herein.

A nonwoven web was formed by depositing carded fibers onto a conveyor using three sequential cards. The outer fiber layers contained 100 percent thermally bonding polypropylene staple fibers of 3.0 denier. The inner layer contained a mixture of staple fibers and bicomponent fibers (Chisso 1.5 denier type PP-MD). The webs were bonded together using a pattern calender roll to provide discrete spaced bonds in the fabric. The calender roll was operated at about 300° F. at a pressure of about 1300 psi to provide spaced bond sites in the machine direction.

The resulting point bonded fabric was subsequently uniformly heated to 257°–266° F. in a relaxes state using forced air heating or infrared. This resulted in shrinkage of the bicomponent fiber and shrinkage between the bond sites, causing a 20% increase in weight and a 400% increase in thickness. During the bulking procedure the feed of the web into the heater and the recovery rate from the heater to a cooling zone was regulated to accommodate about 20% shrinkage of the web in the machine direction.

We claim:

1. A method for making a nonwoven fabric which is bulkable upon subsequent application of heat, said method comprising the steps of providing a pair of outer layers of thermally bondable staple fibers, providing an inner layer of fibers between said outer layers, said inner layer comprising heat shrinkable bicompomponent fibers which are shrinkable at a temperature lower than the softening temperature of the staple fibers, and point bonding said layers together under heat and pressure conditions sufficient to provide a unitary low bulk fabric but insufficient to cause any substantial shrinkage of the heat shrinkable fibers wherein the heat shrinkable fibers comprise less than 25 percent by weight of the fabric.

2. The method of claim 1 wherein said heat shrinkable fibers are oriented in the machine direction.

3. The method of claim 2 wherein the staple fibers are oriented in substantially the machine direction.

4. The method of claim 1 wherein said staple fibers, are carded polypropylene fibers.

5. The method of claim 1 wherein the layers are pattern bonded in directions substantially perpendicular to the machine direction.

6. The method of claim 1 comprising the additional steps of winding the low bulk fabric into a roll, transporting the roll, and uniformly heating the fabric to a temperature sufficient to shrink the heat shrinkable fibers.

7. The method of claim 6 wherein the low bulk fabric is heated in a relaxed state.

8. The method of claim 1 wherein the heat shrinkable fibers comprise from about 5 to about 15 percent by weight of the fabric.

9. A low bulk nonwoven fabric, said fabric being capable of being bulked upon application of heat, said fabric comprising a pair of outer layers of heat bondable thermoplastic staple fibers, an inner layer of thermoplastic fibers comprising heat shrinkable bicomponent fibers in unshrunk condition, and a plurality of spaced thermal point bonds through said layers wherein the heat shrinkable fibers comprises less than 25 percent by weight of the fabric.

10. The fabric of claim 9 wherein said heat shrinkable fibers comprise from about 5 to about 15% of the weight of the fabric.

11. The low bulk fabric of claim 9 wherein said outer layers comprise heat bondable polypropylene fibers.

* * * * *